Jan. 6, 1942.                    G. DREWETT                    2,268,576
        SCREW TYPE CONNECTION FOR CONNECTING STEM MEMBERS AND BORED MEMBERS
                              Filed Jan. 9, 1939                2 Sheets-Sheet 1
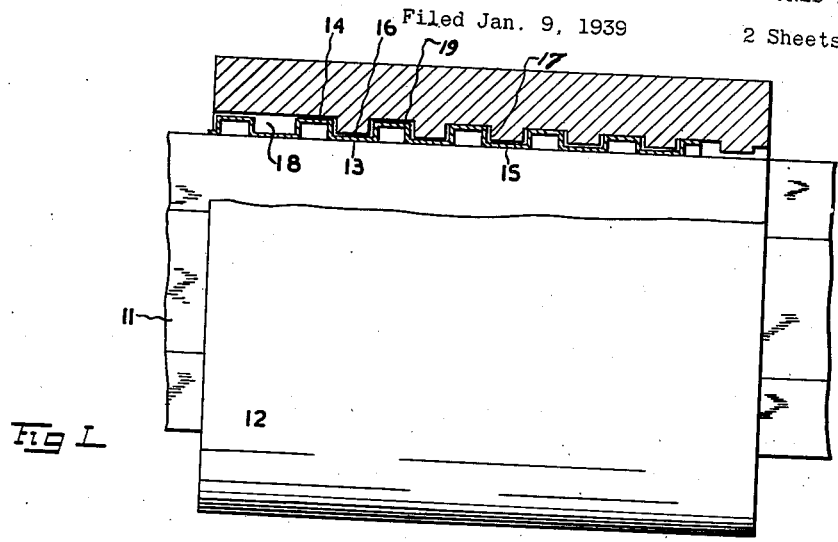
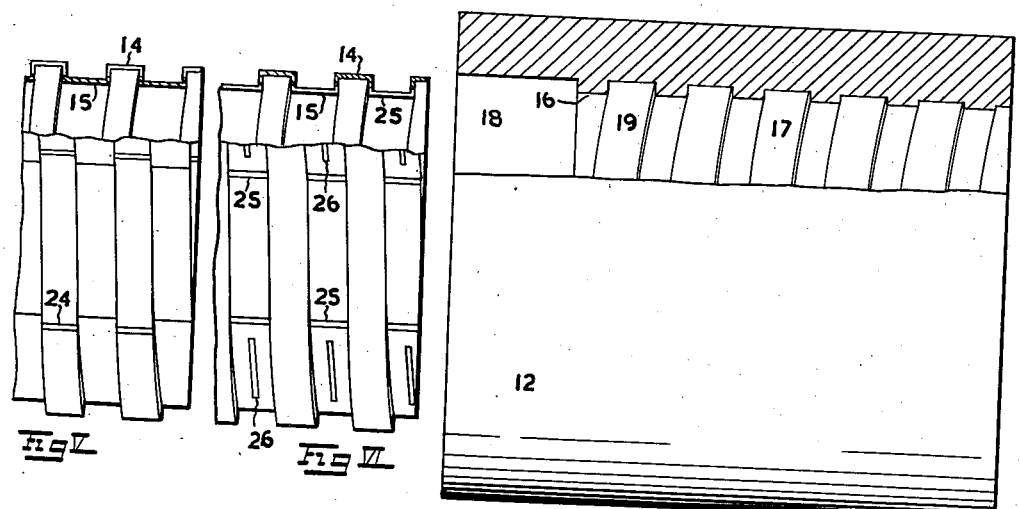
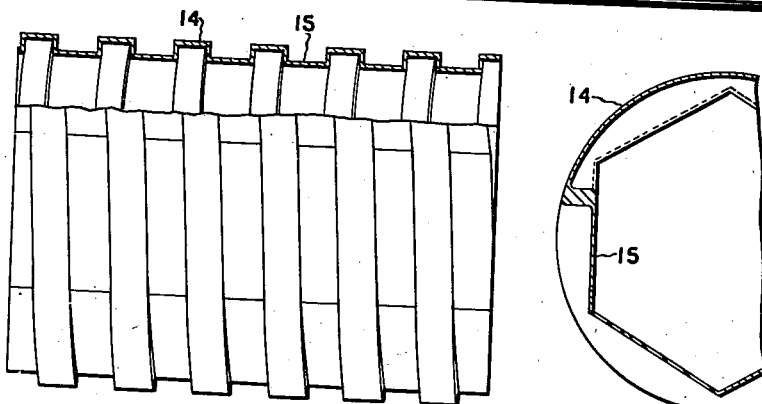
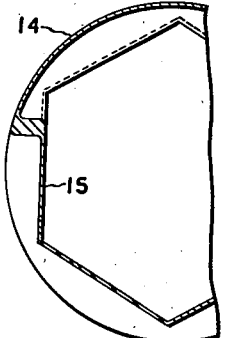
G. Drewett
Inventor
By: Glascock Downing & Seebold Jan. 6, 1942. G. DREWETT 2,268,576
SCREW TYPE CONNECTION FOR CONNECTING STEM MEMBERS AND BORED MEMBERS
Filed Jan. 9, 1939 2 Sheets-Sheet 2
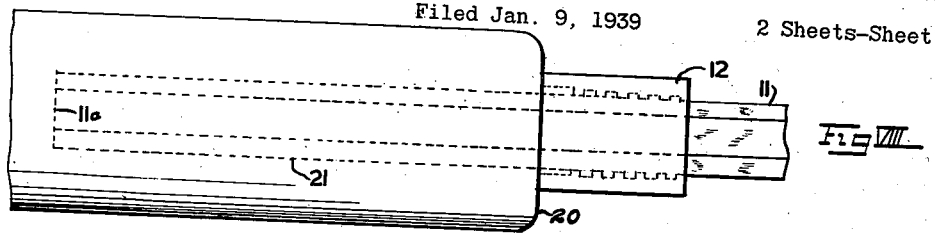
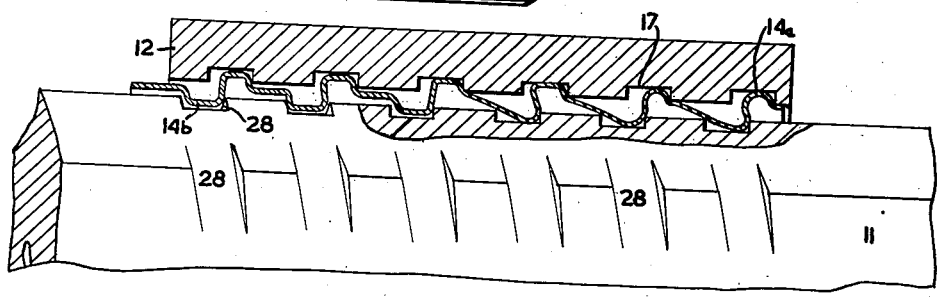
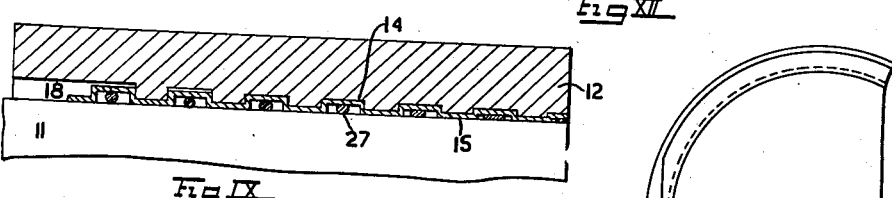
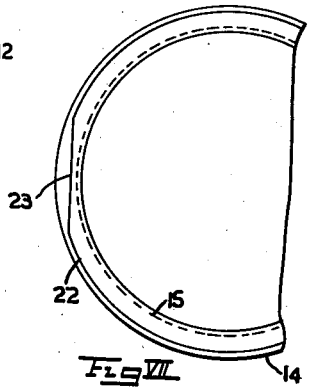
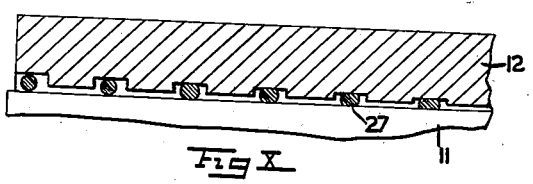
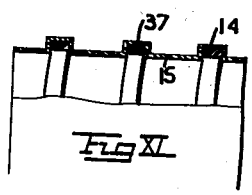
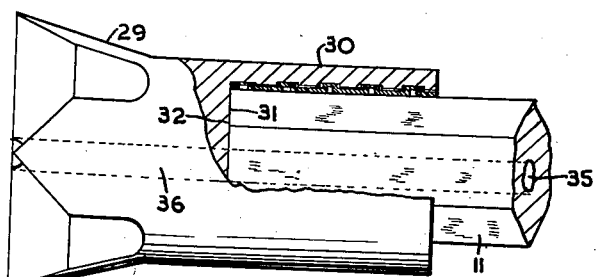
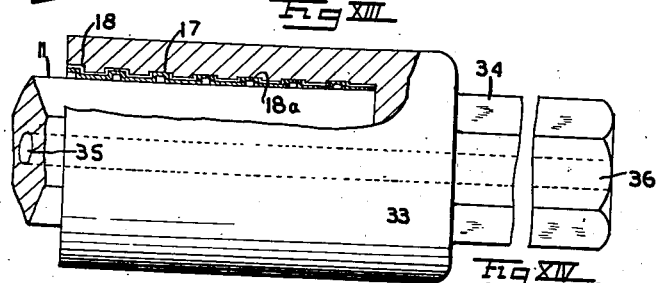
G. Drewett
Inventor Patented Jan. 6, 1942

2,268,576

UNITED STATES PATENT OFFICE 2,268,576

SCREW TYPE CONNECTION FOR CONNECTING STEM MEMBERS AND BORED MEMBERS

George Drewett, Johannesburg, Transvaal, Union of South Africa

Application January 9, 1939, Serial No. 250,052
In Great Britain September 17, 1938

6 Claims. (Cl. 287—52)

This invention relates to means for securing together, by a screw action, the members of a mechanical pair comprising a stem member and a member having a bore in which the stem member is housed. The invention enables the screw connection to be made when one of said members, and particularly the stem member, is not screw threaded; and is thus of value in cases where screw threading of one of the members is undesirable or impossible.

This condition is present in the case of a tool for drilling rock by percussion. Rock drill steel, which is usually hollow, is a well known article of manufacture and is delivered by the manufacturers in commercial lengths from which shorter lengths are cut to make the individual tools. Each such length has then to be provided with a cutting end, and with some formation for limiting its penetration into the percussive drilling machine, such as a collar of greater diameter than the steel, which performs the function mentioned by contacting with the nose of the drilling machine.

It is well known, however, that forging of the steel tends to weaken it substantially and that the more the steel can be used in its "as rolled" condition the less is its liability to fracture when subjected to the intense vibratory stresses arising from its use as a percussive drill tool. In view of this knowledge, collars forged up from the steel are now used only to a small extent. They have been replaced in some cases by a machined formation of the shank end of the tool whereby there is formed a shoulder which is made to perform the function of limiting the penetration of the tool into the machine, and a reduced portion to the rear of the shoulder which receives the blows. As both these formation elements have to be produced within the diameter of the steel, their areas are severely limited and the pressures per unit of their areas correspondingly higher and often excessive. In other cases the forged collar has been replaced by a separate collar clamped to the steel; the difficulty in this case being to devise a means of fixing the collar so securely that the rapidly repeated impacts to which it is subjected do not cause it to shift along the steel.

It is a specific object of the present invention to enable separate collars, detachable bits, and other similar fittings to be firmly secured to lengths of drill steel which are in the "as rolled" condition or have been subject to such small amount of machining that the strength of the steel is not materially impaired.

The invention consists in the combination with a stem member and a bore member within which the stem member is housed, at least one of said members having a helical formation on the surface facing the other member, of an interposed member having a helical formation engaging with the first mentioned helical formation, said helical formations being so differentiated that relative rotation of the members comprising them causes progressive increasing deformation stresses whereby the stem member and the bore member are frictionally bound to the interposed member.

The invention is illustrated in the accompanying drawings in which:

Figure I shows a portion of a percussive drill tool with a collar fixed thereon.

Figure II is a separate longitudinal view of the collar, partly sectioned.

Figure III is a separate view of the sleeve by means of which the collar is fixed.

Figure IV is a section of Figure III.

Figures V and VI are fragmentary views showing modifications of the sleeve of Figure III.

Figure VII is an end view of a different form of sleeve.

Figure VIII shows, on a smaller scale, a rockdrill tool fitted with the collar.

Figures IX, X and XI are fragmentary views showing modifications of the fastening device of Figure I.

Figure XII is a view similar to Figure I showing a different form of fastening.

Figure XIII shows a percussive rockdrill tool fitted with a detachable cutting bit.

Figure XIV shows a percussive rockdrill tool fitted with a detachable shank.

Referring to Figure I, 11 indicates the drill stem consisting of a length of drill steel as manufactured; and 12 is the collar thereon. 13 is an intermediate member, shown as a sleeve which is initially an easy sliding fit on the stem. The essential feature of member 13 is the helical rib 14 on the outside thereof; the principal function of the portions of the sleeve structure 15 lying between the turns of the rib being to position said rib.

The circular bore 16 of the collar is formed with a generally similar helical formation provided by a helical groove 17 which is of the same pitch as the rib 14, and which terminates preferably at a recess 18 in the collar, rather larger in diameter than the groove. The initial portion 19 of said groove 17 is large enough to permit the helical rib 14 to enter it freely. The depth of the groove 17 decreases progressively in the direction from the portion 19 towards the other end of the collar.

In making the connection, the initial portion 19 of the groove is engaged with one end of the rib 14 by a screw motion, and said motion is continued to cause the collar to advance progressively over the sleeve. During such advance, the rib enters progressively shallower cross sections of the groove 17 whereby it is crushed to a progressively increasing extent between the collar and the stem; with correspondingly increasing frictional adherence of both the stem and the collar to the sleeve, which thus acts as a medium frictionally binding the stem and collar together. It is found possible in this way to secure the collar frictionally to the stem with a high degree of immobility.

A practical use of the collar is shown in Figure VIII. 20 indicates the forward end of a rock drilling machine which the shank 21 of the drill stem enters to be struck by the piston hammer of the machine. The collar 12 bears against said forward end to limit the extent of penetration of the shank into the machine in order to ensure that the end face 11a of the shank is in the proper position to be struck by the hammer piston.

The length of the helically grooved portion of the collar is made about equal in length to the sleeve 13; the recess 18 being additional length. When the parts are first screwed together a portion of the sleeve is left in the recess 18 and therefore undeformed. Should the collar 12 shift on the stem as the result of its repeated impacts with the end of the drilling machine, the collar may from time to time be screwed forward over the undeformed portion of the sleeve; being thereby re-tightened and also brought back to its original position on the stem.

Rock drill steel is commercially produced either of circular section or of polygonal section with such a number of sides—viz. six or eight—that it approximates to circular section. A hexagonal section is shown in Figure I. The sleeve 15 is made similarly of hexagonal section which is an easy fit on the steel; but it is convenient to produce the rib 14 in circular form.

Figure VII shows in end view a sleeve both the body 15 and rib 14 of which are circular and which may be used with either round or polygonal sectioned steel. In the latter case it is not difficult to hold the circular sleeve manually against rotation until the advance of the collar 12 begins to crush it onto the corners of the steel, whereupon its freedom to rotate ceases. When the sleeve is applied to round steel its tendency to rotate is usually overcome soon after the collar begins to crush it into firm contact with the steel; but in order to hold the sleeve against rotation until that condition is reached, it is convenient to provide the sleeve with an end flange 22 which can be gripped by a pipe wrench or be formed with flats 23 or equivalent formations which enable it to be held by a spanner. Said flange may also be used as a stop for limiting the forward movement of the collar over the sleeve, and thus—assuming the sleeve itself to have been properly positioned longitudinally of the steel—determining the final position of the collar on the stem in case conditions are such that subsequent shifting of the collar on the stem is not likely to be necessary.

Detail variations of the above described structure are shown in Figures V and VI. The resistance of the sleeve to crushing may be decreased by forming it with slits which tend to close under the crushing forces to which the sleeve is subjected. Examples are shown in Figure V consisting of saw cuts 24 across some or all of the convolutions of the rib 14, for instance in line with the corners of the hexagonal formations. In Figure VI similar saw cuts 25 are made in the sleeve body between the rib convolutions; and additionally or alternatively, in either case, there may be circumferential slits 26 in the carcass of the sleeve. Reduction of the resistance of the sleeve to crushing is preferably made use of in cases where the collar is intended to remain permanently fixed to the stem.

Figure IX shows a wire helix 27 inserted in the hollow interior of the rib 14 in order to stiffen the rib and increase its resistance to deformation when such increase is desired. As shown in Figure X, the wire helix 27 can be used without the sleeve provided it is used in conjunction with some means, near to its end first engaged by the collar, to prevent it from rotating with the collar. The corners of the polygonal steel provide such means. Figure XI shows the interior of the rib packed with material like lead or rubber which is plastic under substantial pressure and has the effect, when the rib 14 is crushed down, both of increasing the frictional adhesion of the sleeve to the stem and of forming a fluid tight joint between them.

It is possible to notch the corners of the polygonal drill steel without more than inconsiderably impairing the strength of the steel; and this fact may be taken advantage of to provide the stem with a helical formation by grinding an interrupted helical groove 28, 28, Figure XII, preferably not deeper than the difference between the diameter over the corners and the diameter over the flats. The helical formation of the sleeve is made to extend from both the outer and the inner faces of the sleeve as indicated by 14a and 14b; the outward extending formation 14a being engaged in the helical groove 17 of the collar and the inwardly extending formation being engaged in the helical groove 28 of the stem. To enable this latter engagement to be accomplished the sleeve as a whole is made capable of expansion and contraction of its diameter; for instance by slitting it longitudinally. A differentiation is made between the pitches of the helices of the several parts. Conveniently the sleeve ribs 14a and 14b and the stem groove 28 are made of the same pitch, and the sleeve is initially brought into position around the stem with its inward formation 14b seated in the stem groove; whilst the pitch of the collar groove 17 is made greater or less than the pitch of the sleeve rib and stem groove. Accordingly as the collar is screwed onto the sleeve it acts to deform the ribs 14a, 14b in the way of forcing them to conform to its own pitch; with the result that the ribs are progressively pinched between a wall of the collar groove and a wall of the stem groove, and the desired frictional grip of the collar and the groove on the sleeve is set up.

Figure XIII shows the invention embodied as a means of securing a detachable cutting bit 29 to the end of the stem 11. In this case the base of the bit is formed with a socket 30, the wall of which embodies the features of the wall of the collar 12 above described. The end surface 31 of the stem and the surface 32 of the base of the socket are made plane transversely to the axis or of other closely complementary form so that they are well adapted to transmit the wave of compression which passes through the tool when a blow is struck on its shank end.

Figure XIV shows a similar socket structure embodied in a detachable shank 33 which is applied to the rear end of the drill stem 11. Beyond the socket the shank structure is continued as a tail piece 34 which enters the rock drilling machine and takes the place of the shank 21 of Figure VIII; whilst the socket also performs the function of the collar 12 of that figure in limiting the extent to which the tail piece enters the chuck.

Rock drill steel is usually formed with a bore 35 through which water is passed to wet the drill cuttings in the drill hole. The bit of Figure XIII and the tail piece 34 of the socket member 33 of Figure XIV are correspondingly provided with bores 36 in continuation of the stem bore 35. The packing 37 of Figure XI is particularly applicable to the structures of Figures XIII and XIV in order to prevent leakage of water between the stem and the bit or detachable shank as the case may be, but is omitted from those figures for the sake of clearness.

Figure XIV also illustrates the case in which the diminution of the depth of the groove 17 ceases after a few turns from the mouth 18; the groove (from and after 18a, by way of example) thereafter being of uniform depth. Such an arrangement is useful where the length of the bored member 33 is considerable, as would often be the case when a long projecting stem is supported in a socket. It has the advantage that after the frictional coupling of the stem member and the bored member has reached a sufficiently high value, penetration of the stem into the bored member can be continued without corresponding increase of the resistance to their relative rotation.

I claim:

1. The combination with a rigid stem member and a bore member within which the stem member is housed, said bore member being formed internally with rigid helical grooving the external diameter of the stem being not greater in diameter than the ungrooved bore of the bore member, of an interposed sleeve of metal many times thinner than the radial thickness of the bore member, said sleeve being helically corrugated to provide hollow helical ribbing co-operating with the helical grooving of the bore member, and also to provide surfaces, between the convolutions of the ribbing, in contact with the stem member and by reason of such thinness and corrugated form being crushable by pressure between said members without deformation of the members themselves, the form of said grooving changing in the axial direction inwards from the mouth of the bore member from a shape suitable freely to accommodate the leading turn of said ribbing to a shape which is not able freely to accommodate it, so that relative rotation of the members by which the ribbing is forced to travel along the grooving causes sleeve to be crushed as aforesaid beyond its elastic limit whereby the crushed sleeve frictionally binds the members together.

2. The combination claimed in claim 1, in which the helical ribbing and the helical grooving are differentiated by the grooving being of progressively decreasing radial depth from the end of the bore member which is first relatively passed on to the sleeve.

3. The combination claimed in claim 1, comprising solid material within the inside of the ribbing so as to contact with the stem, said material being adapted to flow under the crushing pressure to which the sleeve is subjected.

4. The combination consisting of a rigid non-screw-threaded stem member, and a sleeve of thin metal providing an external hollow helical rib shaped out of the thin sleeve metal, said sleeve being fixed on the stem by being molecularly deformed beyond its elastic limit to make binding frictional engagement therewith.

5. The combination claimed in claim 4, in which the sleeve is fixed on the stem by being crushed beyond its elastic limit into frictional binding engagement therewith.

6. The combination claimed in claim 1 in which the stem member within the sleeve is non-threaded and of uniform cross-section.

GEORGE DREWETT.